United States Patent
Kim et al.

(10) Patent No.: US 10,121,004 B2
(45) Date of Patent: Nov. 6, 2018

(54) APPARATUS AND METHOD FOR MONITORING VIRTUAL MACHINE BASED ON HYPERVISOR

(71) Applicant: ELECTRONICS AND TELECOMMUNICATIONS RESEARCH INSTITUTE, Daejeon (KR)

(72) Inventors: Sung-Jin Kim, Daejeon (KR); Woomin Hwang, Daejeon (KR); ByungJoon Kim, Daejeon (KR); ChulWoo Lee, Daejeon (KR); HyoungChun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 173 days.

(21) Appl. No.: 15/274,126

(22) Filed: Sep. 23, 2016

(65) Prior Publication Data

US 2017/0103202 A1    Apr. 13, 2017

(30) Foreign Application Priority Data

Oct. 7, 2015    (KR) .................. 10-2015-0141000
Jun. 17, 2016    (KR) .................. 10-2016-0075780

(51) Int. Cl.
*G08B 23/00*    (2006.01)
*G06F 12/16*    (2006.01)
(Continued)

(52) U.S. Cl.
CPC ........ *G06F 21/566* (2013.01); *G06F 9/45558* (2013.01); *G06F 21/564* (2013.01); *G06F 2009/45587* (2013.01)

(58) Field of Classification Search
CPC .... G06F 21/53; G06F 9/45558; G06F 21/565; G06F 21/566; G06F 2009/45587; G06F 2221/033
(Continued)

(56) References Cited

U.S. PATENT DOCUMENTS 5,485,409 A * 1/1996 Gupta .................. G06F 21/577
    713/164
9,823,992 B2 * 11/2017 Chow ................. G06F 11/3612
(Continued)

FOREIGN PATENT DOCUMENTS

| JP | 2012-003651 A | 1/2012 |
|----|---------------|--------|
| KR | 10-1405831 B1 | 6/2014 |
| KR | 10-1454837 B1 | 10/2014 |

OTHER PUBLICATIONS

Koichi Onoue; Control of System Calls from Outside of Virtual Machines; Citeseer:2008; pp. 2115-2121.*

*Primary Examiner* — Monjur Rahim
(74) *Attorney, Agent, or Firm* — LRK Patent Law Firm

(57) ABSTRACT

An apparatus and method for monitoring a virtual machine based on a hypervisor. The method for monitoring a virtual machine based on a hypervisor includes monitoring an attempt to access an executable file located in a virtual machine, when the attempt to access the executable file is detected, extracting a system call transfer factor, input through a task that attempted to make access, acquiring, based on the system call transfer factor, an execution path corresponding to the executable file and a reference path corresponding to a reference file that is executed together with the executable file, and checking based on the execution path and the reference path whether any of the executable file and the reference file is malicious, and collecting a file in which malicious code is present when the malicious code is present in any of the executable file and the reference file.

16 Claims, 7 Drawing Sheets

(51) Int. Cl.
*G06F 12/14* (2006.01)
*G06F 11/00* (2006.01)
*G06F 21/56* (2013.01)
*G06F 9/455* (2018.01)

(58) Field of Classification Search
USPC .......................................................... 726/23
See application file for complete search history.

(56) References Cited

U.S. PATENT DOCUMENTS

| | | | |
|---|---|---|---|
| 2004/0158819 A1* | 8/2004 | Cuomo | G06F 11/3624 717/128 |
| 2007/0220518 A1* | 9/2007 | Verbowski | G06F 11/3466 718/102 |
| 2008/0127292 A1* | 5/2008 | Cooper | G06F 21/53 726/1 |
| 2009/0271418 A1* | 10/2009 | Vaghani | G06F 11/1435 |
| 2011/0047622 A1* | 2/2011 | Myles | G06F 9/544 726/26 |
| 2011/0145924 A1* | 6/2011 | Kolsek | G06F 21/51 726/25 |
| 2011/0219454 A1* | 9/2011 | Lee | G06F 17/30 726/25 |
| 2012/0255021 A1* | 10/2012 | Sallam | G06F 21/564 726/25 |
| 2013/0055249 A1* | 2/2013 | Vaghani | G06F 3/0617 718/1 |
| 2013/0125119 A1* | 5/2013 | Vipat | G06F 9/45533 718/1 |
| 2014/0283056 A1* | 9/2014 | Bachwani | G06F 21/56 726/23 |
| 2016/0048680 A1* | 2/2016 | Lutas | G06F 21/554 726/23 |

* cited by examiner

APPARATUS AND METHOD FOR MONITORING VIRTUAL MACHINE BASED ON HYPERVISOR

CROSS REFERENCE TO RELATED APPLICATIONS

This application claims the benefit of Korean Patent Application Nos. 10-2015-0141000, filed Oct. 7, 2015 and 10-2016-0075780, filed Jun. 17, 2016, which are hereby incorporated by reference in their entirety into this application.

BACKGROUND OF THE INVENTION

1. Technical Field

The present invention generally relates to technology for monitoring an executable file in a virtual machine and, more particularly, to an apparatus and method for monitoring a virtual machine based on a hypervisor, which can monitor an executable file in the virtual machine using a hypervisor or a virtual host as the basis of trust in a virtualization environment.

2. Description of the Related Art

In a virtualization environment, in order to monitor an executable file and collect malicious files based on a virtual host, monitoring has been capable of being performed in the past by installing a security agent in a host Operating System (OS) kernel or in a user area. That is, there may be used methods, such as a method for monitoring the invocation of system calls related to the execution of an executable file through the security agent, or for monitoring the input/output of a block device and collecting malicious code in a specific path as evidence when an event occurs.

However, in the above example, since such a security agent or a security program is operated with the same authority as malicious code, there is a disadvantage in that malicious code may interfere with the task of monitoring a security program, or may even terminate the monitoring task. Further, in order for malicious code to hide its own existence, activity for concealing the malicious code or immediately deleting the malicious code at the moment at which the malicious code is executed occurs frequently, and thus it is difficult to collect the main body of malicious code, which is required to investigate incidents.

Since a hypervisor in this virtualization environment has higher authority than the guest Operating System (OS) of a virtual machine, it becomes the basis of trust that enables a security task to be performed without being influenced by malicious code in the virtual machine.

Therefore, there is urgently required new virtual machine monitoring technology that monitors an executable file in a virtual machine in a hypervisor area or a virtualization host area, having higher authority than that of the virtual machine, and that is capable of automatically collecting, as evidence, the main body of a malicious file or a related file, which is required for the investigation and analysis of infringement incidents, within a short period of time.

PRIOR ART DOCUMENTS

Patent Documents (Patent Document 1) Korean Patent No. 10-1405831 (Date of Publication: Jun. 3, 2014, entitled "System and Method for Detecting Host File of Malicious Execution Code")

SUMMARY OF THE INVENTION

Accordingly, the present invention has been made keeping in mind the above problems occurring in the prior art, and an object of the present invention is to monitor an executable file in a virtual machine without installing an additional security program in the virtual machine.

Another object of the present invention is to provide a method that is capable of precisely performing monitoring and evidence collection even if a virtual machine OS kernel is hijacked due to hacking, by performing monitoring and evidence collection in a hypervisor area or a virtual host area.

A further object of the present invention is to continuously monitor an executable file in a virtual machine and to automatically collect, as evidence, the main body of a malicious file or a related file required to investigate and analyze infringement incidents within a short period of time.

In accordance with an aspect of the present invention to accomplish the above objects, there is provided a method for monitoring a virtual machine based on a hypervisor, including monitoring an attempt to access an executable file located in a virtual machine; when the attempt to access the executable file is detected, extracting a system call transfer factor, input through a task that attempted to make access; acquiring, based on the system call transfer factor, an execution path corresponding to the executable file and a reference path corresponding to a reference file that is executed together with the executable file; and checking based on the execution path and the reference path whether any of the executable file and the reference file is malicious, and collecting a file in which malicious code is present when the malicious code is present in any of the executable file and the reference file.

Monitoring the attempt may be configured to detect a location of a system call code corresponding to the executable file in virtual memory corresponding to the virtual machine, and to determine that the attempt to access the executable file has occurred if an access event generated based on an attempt to execute the system call code is detected.

Monitoring the attempt may be configured to generate the access event in at least one of a case where the task accesses the location of the system call code and a case where the task accesses a page table entry indicating the location of the system call code, after which an exception occurs.

The page table entry may correspond to at least one of a page table entry that corresponds to a page table managed by a kernel corresponding to the virtual machine and a page table entry that corresponds to a hardware-assisted address translation table inaccessible from inside the virtual machine.

Extracting the system call transfer factor may be configured to, when the access event is detected, extract the system call transfer factor from at least one of a register and a stack used by the virtual machine.

Extracting the system call transfer factor may be configured to, when the access event is detected, generate an identifier set by associating a virtual machine identifier corresponding to the virtual machine with a task identifier corresponding to the task, and identify at least one of the register and the stack based on the identifier set.

Acquiring the execution path and the reference path may be configured to check whether a prefetch file corresponding to the executable file has been deleted, based on an executable file name and a file storage path that are included in the system call transfer factor, and to acquire the execution path and the reference path included in the prefetch file when the prefetch file remains rather than being deleted.

Acquiring the execution path and the reference path may be configured to, when the prefetch file has been deleted, analyze file system metadata indicating a layout of an overall structure of a file system, search for a disk sector corresponding to the prefetch file, acquire actual data corresponding to the prefetch file from the disk sector, and then recover the prefetch file.

The disk sector may denote locations of virtual and physical storage devices indicated by information including a sector number.

Collecting the file may be configured to determine whether any of the executable file and the reference file has been deleted, with reference to the execution path and the reference path, and to recover a deleted file using the file system metadata when at least one of the executable file and the reference file has been deleted.

Collecting the file may be configured to check whether any of the executable file and the reference file is malicious, based on at least one of a signature-based malware detection technique, a behavior-based malware detection technique, and a malware detection technique based on establishment of independent criteria.

Collecting the file may be configured to perform recovery based on any one of a hypervisor area and a virtual host area.

Collecting the file may be configured to collect a file in which malicious code is present from any one of the hypervisor area and the virtual host area and to store the collected file.

In accordance with another aspect of the present invention to accomplish the above objects, there is provided an apparatus for monitoring a virtual machine based on a hypervisor, including a monitoring unit for monitoring an attempt to access an executable file located in a virtual machine; a transfer factor extraction unit for, when the attempt to access the executable file is detected, extracting a system call transfer factor, input through a task that attempted to make access; a path acquisition unit for acquiring, based on the system call transfer factor, an execution path corresponding to the executable file and a reference path corresponding to a reference file that is executed together with the executable file; and a malicious file collection unit for checking based on the execution path and the reference path whether any of the executable file and the reference file is malicious, and collecting a file in which malicious code is present when the malicious code is present in any of the executable file and the reference file.

The monitoring unit may be configured to detect a location of a system call code corresponding to the executable file in virtual memory corresponding to the virtual machine, and to determine that the attempt to access the executable file has occurred if an access event generated based on an attempt to execute the system call code is detected.

The monitoring unit may be configured to generate the access event in at least one of a case where the task accesses the location of the system call code and a case where the task accesses a page table entry indicating the location of the system call code, after which an exception occurs.

The transfer factor extraction unit may extract the system call transfer factor from at least one of a register and a stack used by the virtual machine.

The transfer factor extraction unit may be configured to, when the access event is detected, generate an identifier set by associating a virtual machine identifier corresponding to the virtual machine with a task identifier corresponding to the task, and identify at least one of the register and the stack based on the identifier set.

The path acquisition unit may include a prefetch file checking unit for checking whether a prefetch file corresponding to the executable file has been deleted, based on an executable file name and a file storage path that are included in the system call transfer factor; and a file recovery unit for, when the prefetch file has been deleted, analyzing file system metadata in any one of a hypervisor area and a virtual host area, and then recovering the prefetch file, wherein the execution path and the reference path are acquired through the prefetch file.

The file recovery unit may be configured to analyze the file system metadata, search for a disk sector corresponding to the prefetch file, acquire actual data corresponding to the prefetch file from the disk sector, and then recover the prefetch file.

The disk sector may denote locations of virtual and physical storage devices indicated by information including a sector number.

The malicious file collection unit may be configured to determine whether any of the executable file and the reference file has been deleted, with reference to the execution path and the reference path, and to recover a deleted file using the file system metadata when at least one of the executable file and the reference file has been deleted.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
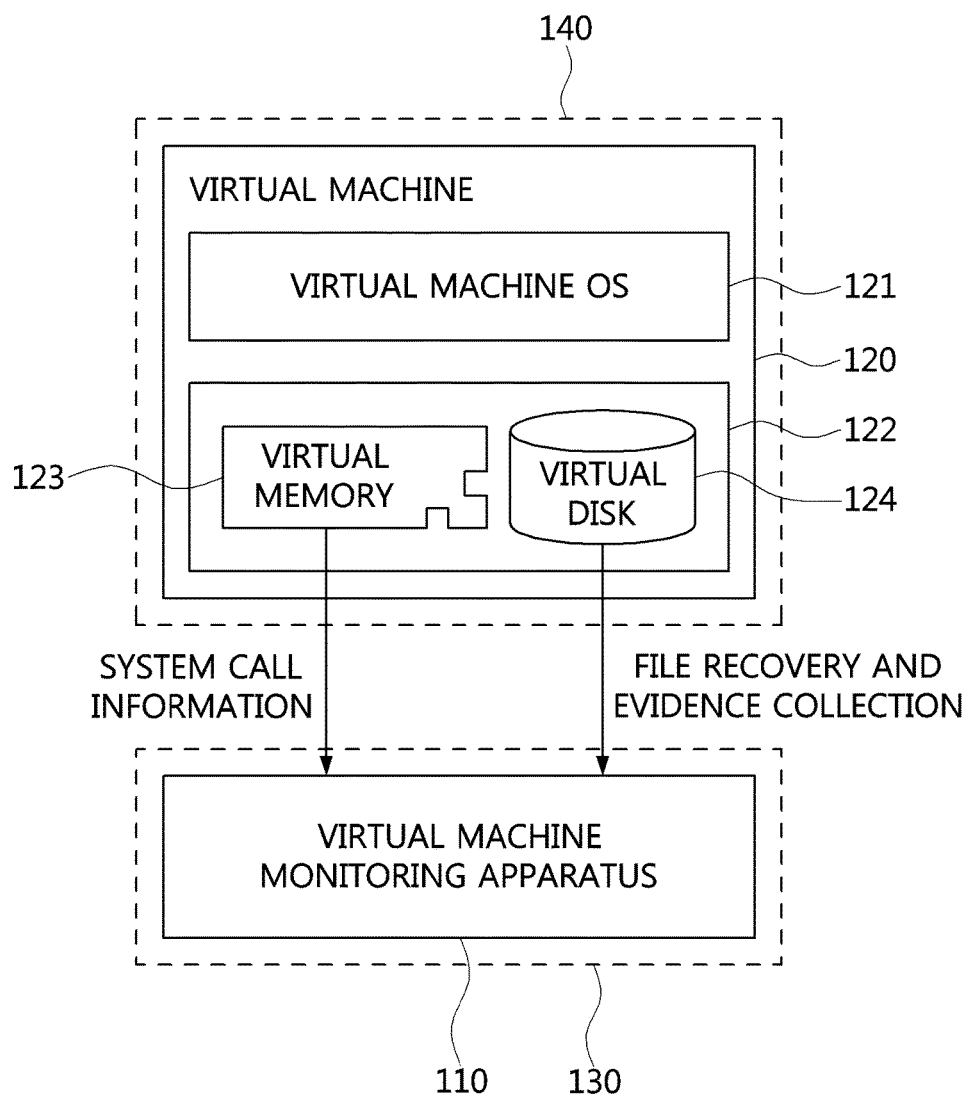
FIG. 1 is a block diagram showing a system for monitoring a virtual machine based on a hypervisor according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

FIG. 1 is a block diagram showing a system for monitoring a virtual machine based on a hypervisor according to an embodiment of the present invention.

Referring to FIG. 1, the system for monitoring a virtual machine based on a hypervisor according to the embodiment of the present invention includes a virtual machine 120, executed in a virtualization area 140, and a virtual machine monitoring apparatus 110, included in a hypervisor area or virtual host area 130.

Here, the environment to which the system for monitoring a virtual machine based on a hypervisor according to the embodiment of the present invention is applied may correspond to a virtual system environment in which multiple virtual machines run on a specific node in a cloud computing environment. That is, in a virtualization environment, the execution of an executable file in the virtual machine 120 may be monitored, and evidence related thereto may be collected, by using the hypervisor area or virtual host area 130 as the basis of trust.

In this case, the virtual machine monitoring apparatus 110 is executed in the hypervisor area or virtual host area 130, which has higher authority than the virtual machine 120, and may monitor the virtual machine 120 based on system calls related to the executable file of the virtual machine 120.

Here, since the virtual machine monitoring apparatus 110 is executed in the hypervisor area or the virtual host area 130, it may be possible to collect malicious files as evidence through accurate monitoring even if a virtual machine OS kernel is taken over by hacking. Further, there is no need to install an additional security agent or an additional security program on the virtual machine 120.

Further, the virtual machine monitoring apparatus 110 may provide a function of continuously monitoring an executable file in the virtual machine 120 and then automatically collecting, as evidence, the main body of a malicious file or a related file, which is required in order to investigate and analyze infringement incidents within a short period of time.

The operation flow of the virtual machine monitoring apparatus 10 may be described as follows.

First, the virtual machine monitoring apparatus 110 monitors an attempt to access an executable file located in the virtual machine 120.

Here, the location of a system call code corresponding to the executable file may be detected in virtual memory 123 corresponding to the virtual machine 120, and it may be determined that an attempt to access the executable file has occurred when an access event generated based on the attempt to execute the system call code is detected.

In this case, an access event may be generated in at least one of the case where a task accesses the location of the system call code and the case where a task accesses a page table entry indicating the location of the system call code, after which an exception occurs.

At this time, the page table entry may correspond to at least one of a page table entry corresponding to a page table managed by a kernel corresponding to the virtual machine 120 and a page table entry corresponding to a hardware-assisted address translation table inaccessible from inside the virtual machine 120.

Further, when an attempt to access the executable file is detected, the virtual machine monitoring apparatus 110 extracts a system call transfer factor that is input through the task that attempted to access the executable file.

When the access event is detected, the system call transfer factor may be extracted from at least one of a register and a stack used by the virtual machine 120.

In this case, when the access event is detected, an identifier set is generated by associating a virtual machine identifier corresponding to the virtual machine 120 with a task identifier corresponding to the task, and at least one of the register and the stack may be identified based on the identifier set.

Further, the virtual machine monitoring apparatus 110 acquires an execution path corresponding to the executable file and a reference path corresponding to a reference file, executed together with the executable file, based on the system call transfer factor.

Here, based on an executable file name and a file storage path, which are included in the system call transfer factor, it is checked whether a prefetch file corresponding to the executable file has been deleted. When the prefetch file remains rather than being deleted, an execution path and a reference path included in the prefetch file may be acquired.

Here, when the prefetch file has been deleted, file system metadata indicating the layout of the overall structure of the file system is analyzed, a disk sector corresponding to the prefetch file is searched for, and actual data corresponding to the prefetch file is acquired from the disk sector, thus enabling the prefetch file to be recovered.

Here, the term "disk sector" denotes the locations of virtual and physical storage devices indicated by information including a sector number, and may include information input required to measure a location, such as a sector number input to the Flash Translation Layer (FTL) of a Solid State Drive (SSD), the location of a physical storage device, such as the physical address of flash memory, etc.

Further, the virtual machine monitoring apparatus 110 checks whether any of the executable file and the reference file is malicious, based on the execution path and the reference path, and collects a file in which malicious code is present when the malicious code is present in any of the executable file and the reference file.

Here, it is determined whether any of the executable file and the reference file has been deleted with reference to the execution path and the reference path, and a deleted file may be recovered using file system metadata when at least one of the executable file and the reference file has been deleted.

In this case, it may be checked whether any of the executable file and the reference file is malicious, based on at least one of a signature-based malware detection technique, a behavior-based malware detection technique, and a malware detection technique based on the establishment of independent criteria.

File recovery may be performed based on any one of the hypervisor area and the virtual host area.

In this case, a file in which malicious code is present may be collected from any one of the hypervisor area and the virtual host area, and the collected file may be stored.

Figure 2:
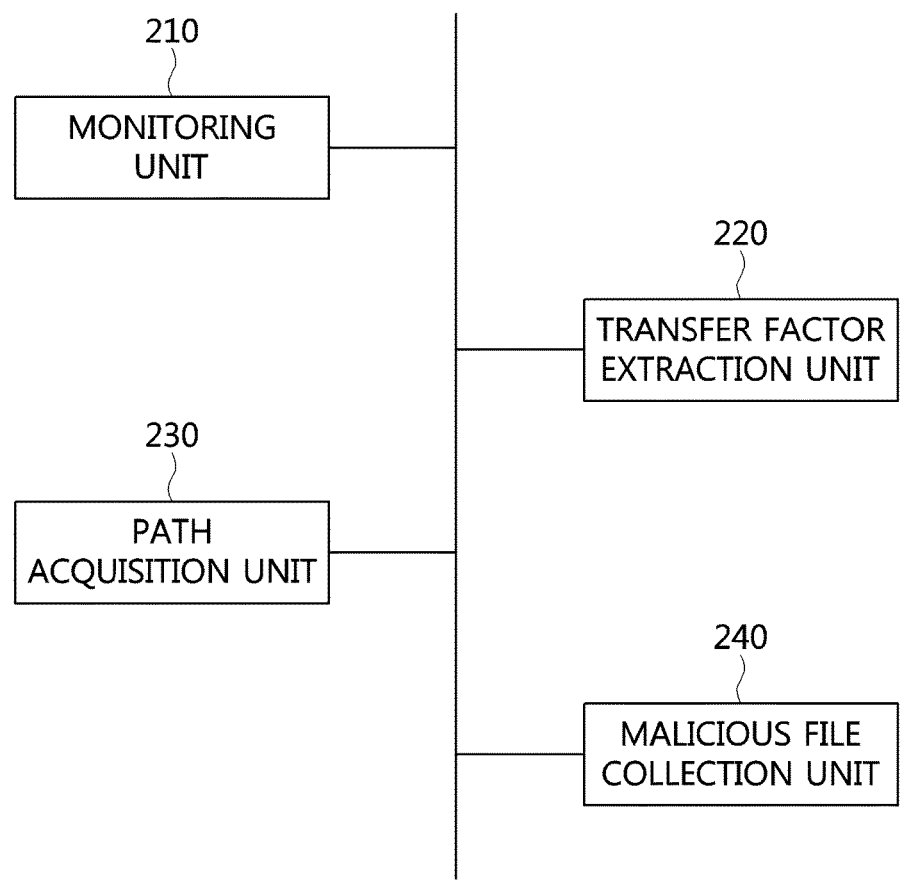
FIG. 2 is a block diagram showing an example of the virtual machine monitoring apparatus shown in FIG. 1.

FIG. 2 is a block diagram showing an example of the virtual machine monitoring apparatus shown in FIG. 1.

Referring to FIG. 2, the virtual machine monitoring apparatus 110 shown in FIG. 1 includes a monitoring unit 210, a transfer factor extraction unit 220, a path acquisition unit 230, and a malicious file collection unit 240.

The monitoring unit 210 monitors an attempt to access an executable file located in a virtual machine. That is, whether an executable file is executed in the virtual machine may be continuously monitored.

Generally, the monitoring of a virtual machine using a security program or a security agent may be executed by installing the security program or the security agent in a host OS kernel or a user area. However, since such a security program is operated by the same authority as malicious code, the task of monitoring the security program may be interfered with by malicious code or the security program may even be terminated by the malicious code.

Therefore, in order to solve this problem, the present invention may perform the monitoring of the executable file in a hypervisor area or a virtual host area, which has higher authority than that of the virtual machine.

Here, the virtual machine monitoring apparatus 110 according to an embodiment of the present invention may monitor the execution of executable files in each of multiple virtual machines in a cloud computing environment in which multiple virtual machines are running. Below, for the convenience of description, any one of the multiple virtual machines will be described by way of example.

Here, the location of a system call code corresponding to the executable file may be determined in the virtual memory corresponding to the virtual machine, and it may be determined that an attempt to access an executable file has occurred when an access event generated based on the attempt to execute the system call code is detected.

In this case, a system call may correspond to an interface for enabling access to a virtual machine kernel in response to an execution request for the executable file provided by the virtual machine kernel. That is, a method for utilizing the service of the virtual machine kernel in the application program of a user space may correspond to the system call.

In order for an arbitrary task to invoke a system call, there is a need to access a system call code, that is, a kernel code, corresponding to the executable file. At this time, the code of the virtual machine kernel corresponding to the system call code may be located in virtual memory. Therefore, the location of the system call code in the virtual memory may be detected.

Here, an access event may be generated in at least one of the case where a task accesses the location of the system call code and the case where a task accesses a page table entry indicating the location of a system call code, after which an exception occurs.

For example, when access to the page table entry is detected, a page table is set to cause an exception, and an access event may be generated by recognizing the exception.

Here, the page table is a data structure used in a paging technique, and may correspond to a table which stores the page information of a process. Further, a page table entry may correspond to the record of the page table. That is, the system call code of the executable file may be located in a page table entry corresponding to the executable file.

Therefore, when an arbitrary task in the virtual memory accesses a system call code corresponding to an executable file or a page table entry corresponding to the executable file, it is determined that an attempt to access the executable file has occurred, and an access event may be generated to provide notification of the occurrence of the access attempt.

Here, the page table entry may be at least one of a page table entry corresponding to a page table managed by the kernel corresponding to the virtual machine and a page table entry corresponding to a hardware-assisted address translation table inaccessible from inside the virtual machine.

Here, a single process may have a single page table.

The address translation table may correspond to a table in which a data item or a command address in a virtual storage system is translated from the virtual memory address into the actual storage address and the translated virtual memory address is stored.

When an attempt to access the executable file is detected, the transfer factor extraction unit 220 extracts a system call transfer factor, which is input through the task that attempted to make access.

Here, when an access event is detected, the system call transfer factor may be extracted from at least one of a register and a stack used by the virtual machine.

The system call transfer factor may correspond to a transfer factor that is input to the register or the stack so as to invoke a system call.

Here, when an access event is detected, an identifier set is generated by associating a virtual machine identifier corresponding to the virtual machine with a task identifier corresponding to the task, and at least one of the register and the stack may be identified based on the identifier set.

Here, as an access event is detected, the task identifier of the task that attempted to access the executable file and the virtual machine identifier of a virtual machine in which the access attempt occurs may be obtained.

The path acquisition unit 230 may acquire the execution path corresponding to the executable file and a reference path corresponding to a reference file, executed together with the executable file, based on the system call transfer factor.

Here, based on an executable file name and a file storage path which are included in the system call transfer factor, it is checked whether a prefetch file corresponding to the executable file has been deleted, and an execution path and a reference path included in the prefetch file may be acquired when the prefetch file remains rather than being deleted.

Here, the prefetch file may correspond to a kind of cache file in which an OS stores information about an executable program loaded into memory so as to improve the execution efficiency of the program. Therefore, the prefetch file may include execution summary information, such as the execution path name of an executable file and the path name of a reference file executed along with the executable file, together with the main body of the program.

Therefore, when the prefetch file has been deleted, execution summary information may be acquired through the procedure for recovering the deleted file.

Here, when the prefetch file has been deleted, file system metadata indicating the layout of the overall structure of the file system is analyzed, a disk sector corresponding to the prefetch file is searched for, and actual data corresponding to the prefetch file is acquired from the disk sector, thus enabling the prefetch file to be recovered.

Here, the term "disk sector" denotes the locations of virtual and physical storage devices indicated by information including a sector number, and may include information input required to measure a location, such as a sector number input to the Flash Translation Layer (FTL) of a Solid State Drive (SSD), the location of a physical storage device, such as the physical address of flash memory, etc.

Here, when the file system metadata is analyzed, information about a deleted file or directory, information about the location of a disk sector in which actual data is stored, etc. may be acquired.

Further, unless the prefetch file is deleted, the execution path and the reference path may be acquired by immediately analyzing the prefetch file without passing through a recovery procedure.

The malicious file collection unit 240 checks whether any of the executable file and the reference file is malicious, based on the execution path and the reference path, and collects a file in which malicious code is present when the malicious code is present in any of the executable file and the reference file.

Here, it is determined whether any of the executable file and the reference file has been deleted with reference to the execution path and the reference path, and a deleted file may be recovered using file system metadata when at least one of the executable file and the reference file has been deleted.

Here, the procedure for recovering a deleted executable file or a deleted reference file may be performed by analyzing metadata using the same procedure as the procedure for recovering the deleted prefetch file and by acquiring the actual data of the deleted file.

In this case, it may be checked whether any of the executable file and the reference file is malicious, based on at least one of a signature-based malware detection technique, a behavior-based malware detection technique, and a malware detection technique based on the establishment of independent criteria.

Here, the signature-based malware detection method corresponds to a static analysis method, and may be performed by analyzing the features of previously collected malicious code and generating a signature for detecting the corresponding malicious code. For example, a method for judging previously known malicious code using an antivirus (AV) scan or analyzing character strings in a file header and a binary file may be used. In a more technical method, it may be determined whether the corresponding code is malicious code by using a method, such as the analysis of an Application Program Interface (API) invocation relationship, based on a debugger.

Here, the behavior-based malware detection technique corresponds to a dynamic analysis method, and may use a scheme for hooking an API function in a user mode and a kernel mode or a scheme for monitoring an event notification routine automatically called by the system when a specific event occurs, in an analysis environment in order to detect a change in an OS. Here, based on the corresponding information, the sequence of execution of executable files may be entirely stored as a log. Further, the extent of similarity of the form of execution of the executable file to the form of execution of malicious code is measured. If the corresponding executable file is diagnosed as malicious code, the system may be recovered in the reverse direction of the sequence in which the files are executed, based on log values.

Here, the malware detection technique based on the establishment of independent criteria may literally correspond to a scheme for establishing independent criteria in the system and diagnosing an executable file, which satisfies the corresponding criteria, as malicious code.

Here, recovery may be performed based on any one of the hypervisor area and the virtual host area.

For example, when at least one of the prefetch file, the executable file, and the reference file is deleted, recovery may be performed based on any one of the hypervisor area and the virtual host area.

Here, a file in which malicious code is present is collected from any one of the hypervisor area and the virtual host area, and the collected file may be stored.

Here, the collected file may be stored in an additional storage module and may be used to analyze malicious files.

In this case, since it is possible to directly access the virtual disk at a higher priority than the virtual machine without being influenced by the context of a virtual machine OS based on the hypervisor area and the virtual host area, it is possible to prevent access from being prohibited or the results of access from being forged even if the virtual machine OS is taken over by malicious code or a malicious file.

Although not shown in FIG. 2, the hypervisor-based virtual machine monitoring method according to the embodiment of the present invention may further include a storage module for storing various types of information generated during the virtual machine monitoring procedure according to an embodiment of the present invention, as described above.

In accordance with an embodiment, the storage module may be configured independently of the virtual machine monitoring apparatus and may support a function for monitoring a virtual machine. Here, the storage module may act as a separate large-capacity storage and may include a control function for performing operations.

Meanwhile, the virtual machine monitoring apparatus is equipped with memory and is capable of storing information therein. In an embodiment, memory is a computer-readable storage medium. In an embodiment, the memory may be a volatile memory unit, and in another embodiment, the memory may be a nonvolatile memory unit. In an embodiment, a storage device is a computer-readable medium. In various different embodiments, the storage device may include, for example, a hard disk device, an optical disk device or any other type of large-capacity storage device.

By utilizing the virtual machine monitoring apparatus, an executable file in a virtual machine may be monitored without an additional security program being installed in the virtual machine.

Further, monitoring and evidence collection may be performed in the hypervisor area or virtual host area, and thus a method capable of performing accurate monitoring and evidence collection may be provided even if the virtual machine OS kernel is hijacked due to hacking.

Furthermore, an executable file in a virtual machine may be continuously monitored, and the main body of a malicious file or a related file, which is required in order to investigate and analyze infringement incidents, may be automatically collected as evidence within a short period of time.

Figure 3:
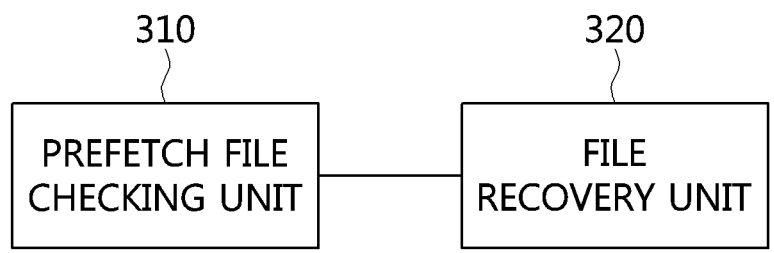
FIG. 3 is a block diagram showing an example of the path acquisition unit shown in FIG. 2.

FIG. 3 is a block diagram showing an example of the path acquisition unit shown in FIG. 2.

Referring to FIG. 3, the path acquisition unit 230 shown in FIG. 2 includes a prefetch file checking unit 310 and a file recovery unit 320.

The prefetch file checking unit 310 checks whether a prefetch file corresponding to an executable file has been deleted, based on an executable file name and a file storage path which are included in a system call transfer factor.

Here, when the prefetch file remains rather than being deleted, an execution path and a reference path, which are included in the prefetch file, may be acquired.

The prefetch file may correspond to a kind of cache file in which an OS stores information about an executable program loaded into memory so as to improve the execution efficiency of the program. Therefore, the prefetch file may include execution summary information, such as the execution path name of an executable file and the path name of a reference file executed together with the executable file, as well as the main body of the program.

Therefore, when the prefetch file has been deleted, the execution summary information may be obtained through a procedure for recovering the prefetch file.

When the prefetch file has been deleted, the file recovery unit 320 analyzes file system metadata in any one of the hypervisor area and the virtual host area and then recovers the prefetch file.

Here, the disk sector corresponding to the prefetch file is searched for by analyzing file system metadata, and the prefetch file may be recovered by obtaining the actual data corresponding to the prefetch file from the disk sector.

Here, the term "disk sector" denotes the location of virtual and physical storage devices indicated by information including a sector number, and may include information input required to measure a location, such as a sector number input to the Flash Translation Layer (FTL) of a Solid State Drive (SSD), the location of a physical storage device, such as the physical address of flash memory, etc.

In this case, when the file system metadata is analyzed, information about a deleted file or directory, information about the location of the disk sector in which the actual data is stored, etc. may be obtained.

Further, when it is determined that the prefetch file has not been deleted, the prefetch file may be immediately analyzed without undergoing a recovery procedure, and then the execution path and the reference path may be acquired.

Figure 4:
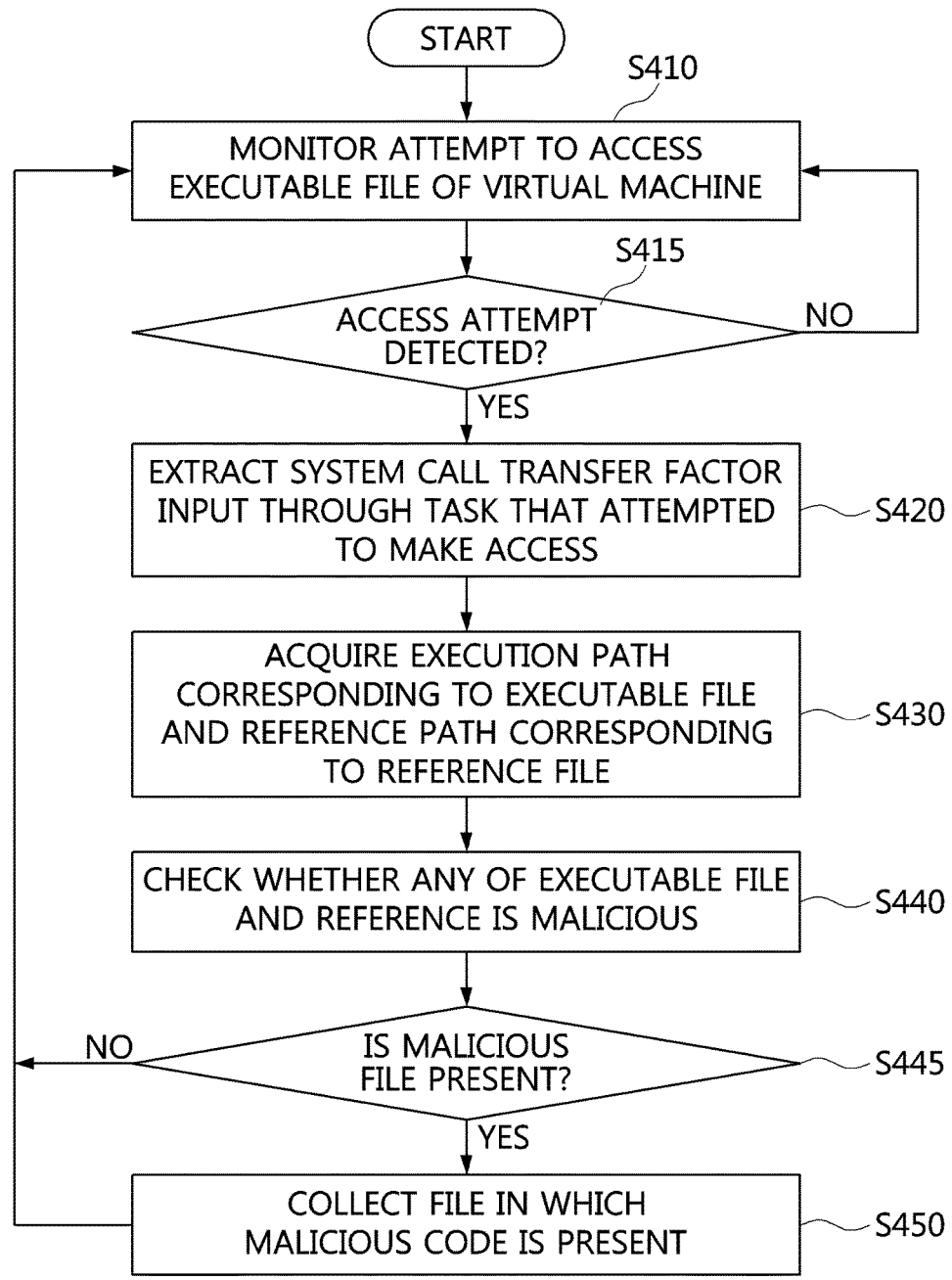
FIG. 4 is an operation flowchart showing a method for monitoring a virtual machine based on a hypervisor according to an embodiment of the present invention.

FIG. 4 is an operation flowchart showing a method for monitoring a virtual machine based on a hypervisor according to an embodiment of the present invention.

Referring to FIG. 4, the method for monitoring a virtual machine based on a hypervisor according to the embodiment of the present invention monitors an attempt to access an executable file located in the virtual machine at step S410. That is, whether an executable file is executed in the virtual machine may be continuously monitored.

Generally, the monitoring of a virtual machine using a security program or a security agent may be executed by installing the security program or the security agent in a host OS kernel or a user area. However, since such a security program is operated by the same authority as malicious code, the task of monitoring the security program may be interfered with by the malicious code or the security program may even be terminated by the malicious code.

Therefore, in order to solve this problem, the present invention may perform the monitoring of the executable file in a hypervisor area or a virtual host area, which has higher authority than that of the virtual machine.

Here, the virtual machine monitoring method according to an embodiment of the present invention may monitor the execution of executable files in each of multiple virtual machines in a cloud computing environment in which multiple virtual machines are running. Below, for the convenience of description, any one of the multiple virtual machines will be described by way of example.

Further, the method for monitoring the virtual machine based on the hypervisor according to the embodiment of the present invention determines whether an attempt to access the executable file has been detected at step S415.

Here, the location of a system call code corresponding to the executable file may be determined in the virtual memory corresponding to the virtual machine, and it may be determined that an attempt to access an executable file has occurred when an access event generated based on the attempt to execute the system call code is detected.

In this case, a system call may correspond to an interface for enabling access to a virtual machine kernel in response to an execution request for the executable file provided by the virtual machine kernel. That is, a method for utilizing the service of the virtual machine kernel in the application program of a user space may correspond to the system call.

In order for an arbitrary task to invoke a system call, there is a need to access a system call code, that is, a kernel code, corresponding to the executable file. At this time, the code of the virtual machine kernel corresponding to the system call code may be located in virtual memory. Therefore, the location of the system call code in the virtual memory may be detected.

Here, an access event may be generated in at least one of the case where a task accesses the location of the system call code and the case where a task accesses a page table entry indicating the location of a system call code, after which an exception occurs.

For example, when access to the page table entry is detected, a page table is set to cause an exception, and an access event may be generated by recognizing the exception.

Here, the page table is a data structure used in a paging technique, and may correspond to a table which stores the page information of a process. Further, a page table entry may correspond to the record of the page table. That is, the system call code of the executable file may be located in a page table entry corresponding to the executable file.

Therefore, when an arbitrary task in the virtual memory accesses a system call code corresponding to an executable file or a page table entry corresponding to the executable file, it is determined that an attempt to access the executable file has occurred, and an access event may be generated to provide notification of the occurrence of the access attempt.

Here, the page table entry may be at least one of a page table entry corresponding to a page table managed by the kernel corresponding to the virtual machine and a page table entry corresponding to a hardware-assisted address translation table inaccessible from inside the virtual machine.

Here, a single process may have a single page table.

The address translation table may correspond to a table in which a data item or a command address in a virtual storage system is translated from the virtual memory address into the actual storage address and the translated virtual memory address is stored.

If it is determined at step S415 that the access attempt is not detected, the attempt to access the executable file may be continuously monitored.

If it is determined at step S415 that the access attempt has been detected, a system call transfer factor, input through the task that attempted to make access, is extracted at step S420.

Here, when an access event is detected, the system call transfer factor may be extracted from at least one of a register and a stack used by the virtual machine.

The system call transfer factor may correspond to a transfer factor that is input to the register or the stack so as to invoke a system call.

Here, when an access event is detected, an identifier set is generated by associating a virtual machine identifier corresponding to the virtual machine with a task identifier corresponding to the task, and at least one of the register and the stack may be identified based on the identifier set.

As an access event is detected, the task identifier of the task that attempted to access the executable file and the virtual machine identifier of a virtual machine in which the access attempt occurs may be obtained.

Further, the method for monitoring the virtual machine based on the hypervisor according to the embodiment of the present invention acquires an execution path corresponding to the executable file and a reference path corresponding to a reference file executed together with the executable file, based on the system call transfer factor at step S430.

Here, based on an executable file name and a file storage path which are included in the system call transfer factor, it is checked whether a prefetch file corresponding to the executable file has been deleted, and an execution path and a reference path included in the prefetch file may be acquired when the prefetch file remains rather than being deleted.

Here, the prefetch file may correspond to a kind of cache file in which an OS stores information about an executable program loaded into memory so as to improve the execution efficiency of the program. Therefore, the prefetch file may include execution summary information, such as the execution path name of an executable file and the path name of a reference file executed along with the executable file, together with the main body of the program.

Therefore, when the prefetch file has been deleted, execution summary information may be acquired through the procedure for recovering the deleted file.

Here, when the prefetch file has been deleted, file system metadata indicating the layout of the overall structure of the file system is analyzed, a disk sector corresponding to the prefetch file is searched for, and actual data corresponding to the prefetch file is acquired from the disk sector, thus enabling the prefetch file to be recovered.

The term "disk sector" denotes the locations of virtual and physical storage devices indicated by information including a sector number, and may include information input required to measure a location, such as a sector number input to the Flash Translation Layer (FTL) of a Solid State Drive (SSD), the location of a physical storage device, such as the physical address of flash memory, etc.

In this case, when the file system metadata is analyzed, information about a deleted file or directory, information about the location of the disk sector in which the actual data is stored, etc. may be obtained.

Further, when it is determined that the prefetch file has not been deleted, the prefetch file may be immediately analyzed without undergoing a recovery procedure, and then the execution path and the reference path may be acquired.

Further, the method for monitoring the virtual machine based on the hypervisor according to the embodiment of the present invention checks whether any of the executable file and the reference file is malicious, based on the execution path and the reference path at step S440.

Here, it is determined whether any of the executable file and the reference file has been deleted with reference to the execution path and the reference path, and a deleted file may be recovered using file system metadata when at least one of the executable file and the reference file has been deleted.

The procedure for recovering a deleted executable file or a deleted reference file may be performed by analyzing metadata using the same procedure as the procedure for recovering the deleted prefetch file and by acquiring the actual data of the deleted file.

In this case, it may be checked whether any of the executable file and the reference file is malicious, based on at least one of a signature-based malware detection technique, a behavior-based malware detection technique, and a malware detection technique based on the establishment of independent criteria.

Here, the signature-based malware detection method corresponds to a static analysis method, and may be performed by analyzing the features of previously collected malicious code and generating a signature for detecting the corresponding malicious code. For example, a method for judging previously known malicious code using an antivirus (AV) scan or analyzing character strings in a file header and a binary file may be used. In a more technical method, it may be determined whether the corresponding code is malicious code by using a method, such as the analysis of an Application Program interface (API) invocation relationship, based on a debugger.

Here, the behavior-based malware detection technique corresponds to a dynamic analysis method, and may use a scheme for hooking an API function in a user mode and a kernel mode or a scheme for monitoring an event notification routine automatically called by the system when a specific event occurs, in an analysis environment in order to detect a change in an OS. Here, based on the corresponding information, the sequence of execution of executable files may be entirely stored as a log. Further, the extent of similarity of the form of execution of the executable file to the form of execution of malicious code is measured. If the corresponding executable file is diagnosed as malicious code, the system may be recovered in the reverse direction of the sequence in which the files are executed, based on log values.

Further, the malware detection technique based on the establishment of independent criteria may literally correspond to a scheme for establishing independent criteria in the system and diagnosing an executable file, which satisfies the corresponding criteria, as malicious code.

Here, recovery may be performed based on any one of the hypervisor area and the virtual host area.

For example, when at least one of the prefetch file, the executable file, and the reference file is deleted, recovery may be performed based on any one of the hypervisor area and the virtual host area.

Further, the method for monitoring the virtual machine based on the hypervisor according to the embodiment of the present invention determines whether, of the executable file and the reference file, a malicious file is present at step S445.

As a result of the determination at step S445, when, of the executable file and the reference file, a malicious file is found to be present, a file (malicious file) in which malicious code is present is collected from any one of the hypervisor area and the virtual host area, and the collected file may be stored.

Here, the collected file may be stored in an additional storage module and may be used to analyze malicious files.

In this case, since it is possible to directly access the virtual disk at a higher priority than the virtual machine without being influenced by the context of a virtual machine OS based on the hypervisor area and the virtual host area, it is possible to prevent access from being prohibited or the results of access from being forged even if the virtual machine OS is taken over by malicious code or a malicious file.

Furthermore, as a result of the determination at step S445, if, of the executable file and the reference file, a malicious file is not present, an attempt to access the executable file may be continuously monitored.

Although not shown in FIG. 4, the hypervisor-based virtual machine monitoring method according to the embodiment of the present invention may store various types of information generated during the virtual machine monitoring procedure according to an embodiment of the present invention, as described above.

In accordance with an embodiment, a storage module for storing information may be configured independently of the virtual machine monitoring apparatus and may support a function for monitoring a virtual machine. Here, the storage module may act as a separate large-capacity storage and may include a control function for performing operations.

Through the virtual machine monitoring method, an executable file in the virtual machine may be monitored without an additional security program being installed on the virtual machine.

Further, monitoring and evidence collection may be performed in the hypervisor area or virtual host area, and thus a method capable of performing accurate monitoring and evidence collection may be provided even if the virtual machine OS kernel is hijacked due to hacking.

Furthermore, an executable file in a virtual machine may be continuously monitored, and the main body of a malicious file or a related file, which is required in order to investigate and analyze infringement incidents, may be automatically collected as evidence within a short period of time.

Figure 5:
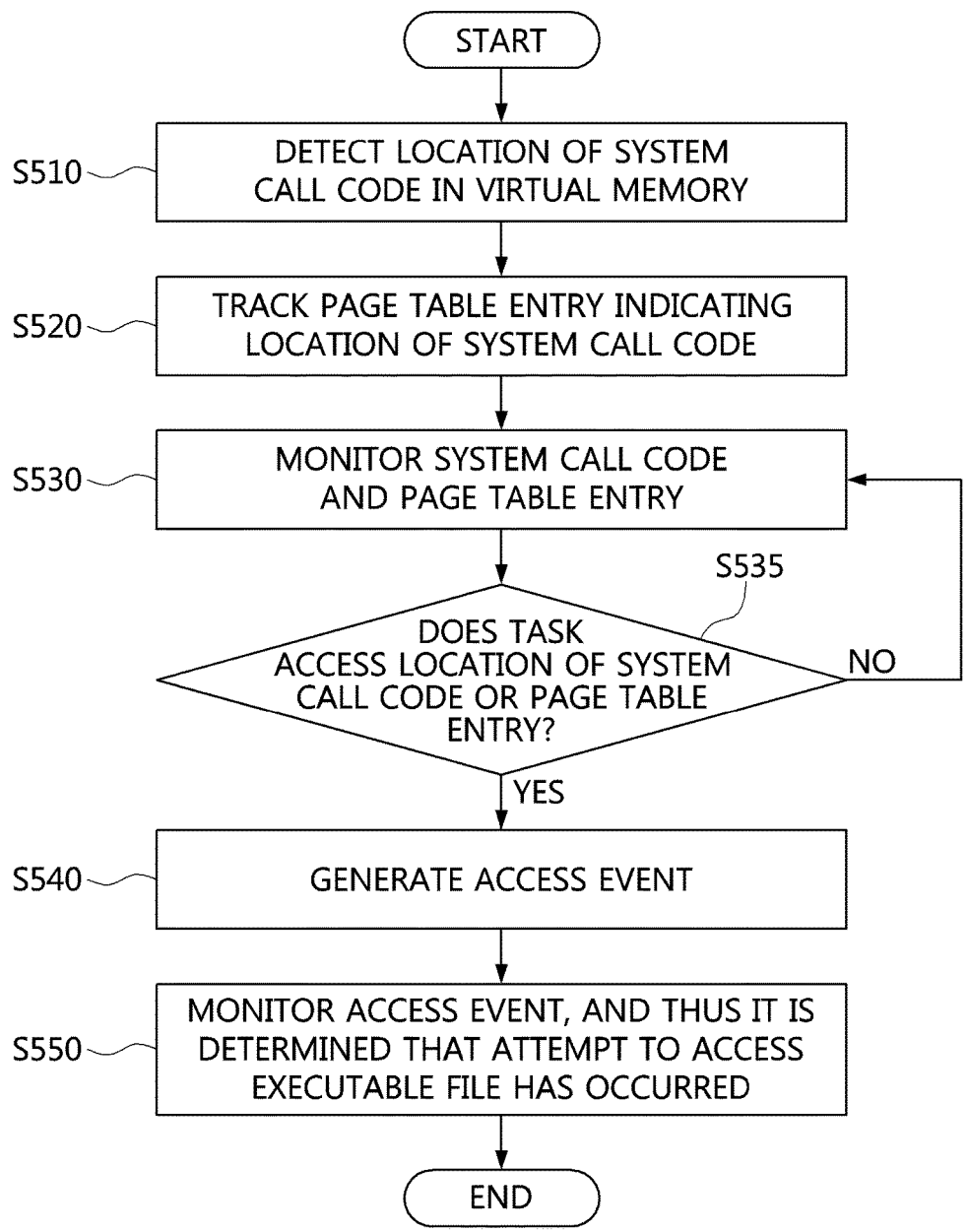
FIG. 5 is an operation flowchart showing in detail a procedure for monitoring an attempt to access an executable file in the virtual machine monitoring method shown in FIG. 4.

FIG. 5 is an operation flowchart showing in detail a procedure for monitoring an attempt to access an executable file in the virtual machine monitoring method shown in FIG. 4.

Referring to FIG. 5, in the procedure for monitoring the attempt to access an executable file in the virtual machine monitoring method shown in FIG. 4, the location of system call code of a system call, corresponding to the executable file, may be detected in virtual memory at step S510.

Here, the system call may correspond to an interface that enables access to a virtual machine kernel in response to an execution request for an executable file provided by the virtual machine kernel. That is, a method for utilizing the service of the virtual machine kernel on an application program in user space may correspond to the system call.

At this time, in order for an arbitrary task to invoke a system call, there is a need to access a system call code, that is, a kernel code, corresponding to the executable file. In this case, the code of the virtual machine kernel corresponding to the system call code may be located in the virtual memory. Therefore, the location of the system call code may be detected in the virtual memory.

Thereafter, a page table entry indicating the location of the system call code is tracked at step S520, and the system call code and the page table entry may be monitored at step S530.

In this case, a page table is a data structure used in a paging technique, and may correspond to a table in which the page information of the process is stored. Further, the page table entry may correspond to the record of the page table. That is, the location of the system call code corresponding to the executable file may be obtained through a page table entry corresponding to the executable file.

Here, the page table entry may correspond to at least one of a page table entry corresponding to a page table managed by a kernel corresponding to the virtual machine and a page table entry corresponding to a hardware-assisted address translation table inaccessible from inside the virtual machine.

Thereafter, it may be determined whether an arbitrary task accesses the location of the system call code or the page table entry at step S535.

If it is determined at step S535 that the arbitrary task does not access the location of the system call code or the page table entry, monitoring may be continuously performed.

In contrast, if it is determined at step S535 that the arbitrary task accesses the location of the system call code or the page table entry, an access event may be generated at step S540.

That is, when the arbitrary task in the virtual memory accesses a system call code corresponding to the executable file or a page table entry corresponding to the executable file, it may be determined that an attempt to access the executable file has occurred, and an access event may be generated so as to provide notification of the occurrence of the access attempt.

Here, the page table is set such that, when the arbitrary task accesses the page table entry, an exception occurs, and thus it may be determined whether the task accesses the page table entry.

Thereafter, the access event may be monitored, and thus it may be determined that the attempt to access the executable file has occurred at step S550.

Figure 6:
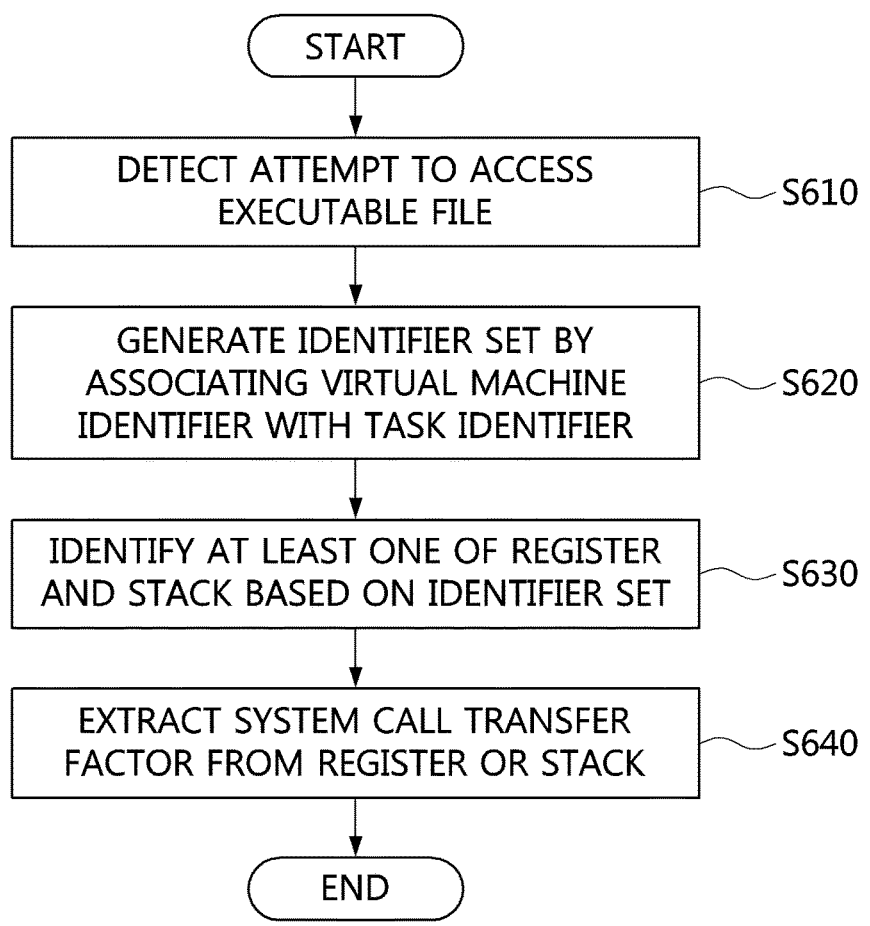
FIG. 6 is an operation flowchart showing in detail a procedure for extracting a system call transfer factor in the virtual machine monitoring method shown in FIG. 4.

FIG. 6 is an operation flowchart showing in detail a procedure for extracting a system call transfer factor in the virtual machine monitoring method shown in FIG. 4.

Referring to FIG. 6, in the procedure for extracting a system call transfer factor in the virtual machine monitoring method shown in FIG. 4, when an attempt to access an executable file in a virtual machine is detected at step S610, an identifier set may be generated by associating the virtual machine identifier with the task identifier of the arbitrary task that attempted to access the executable file at step S620.

When an access event corresponding to the access attempt is detected, the task identifier of the task that has attempted to access the executable file and the virtual machine identifier of the virtual machine in which the access attempt has been made may be obtained.

Thereafter, at least one of a register and a stack used by the virtual machine may be identified based on the identifier set at step S630.

Then, the system call transfer factor may be extracted from the register or the stack at step S640.

In this case, the system call transfer factor stored in the register or the stack may be extracted.

At this time, the system call transfer factor may correspond to a transfer factor that is input to the register or the stack so as to invoke a system call.

Figure 7:
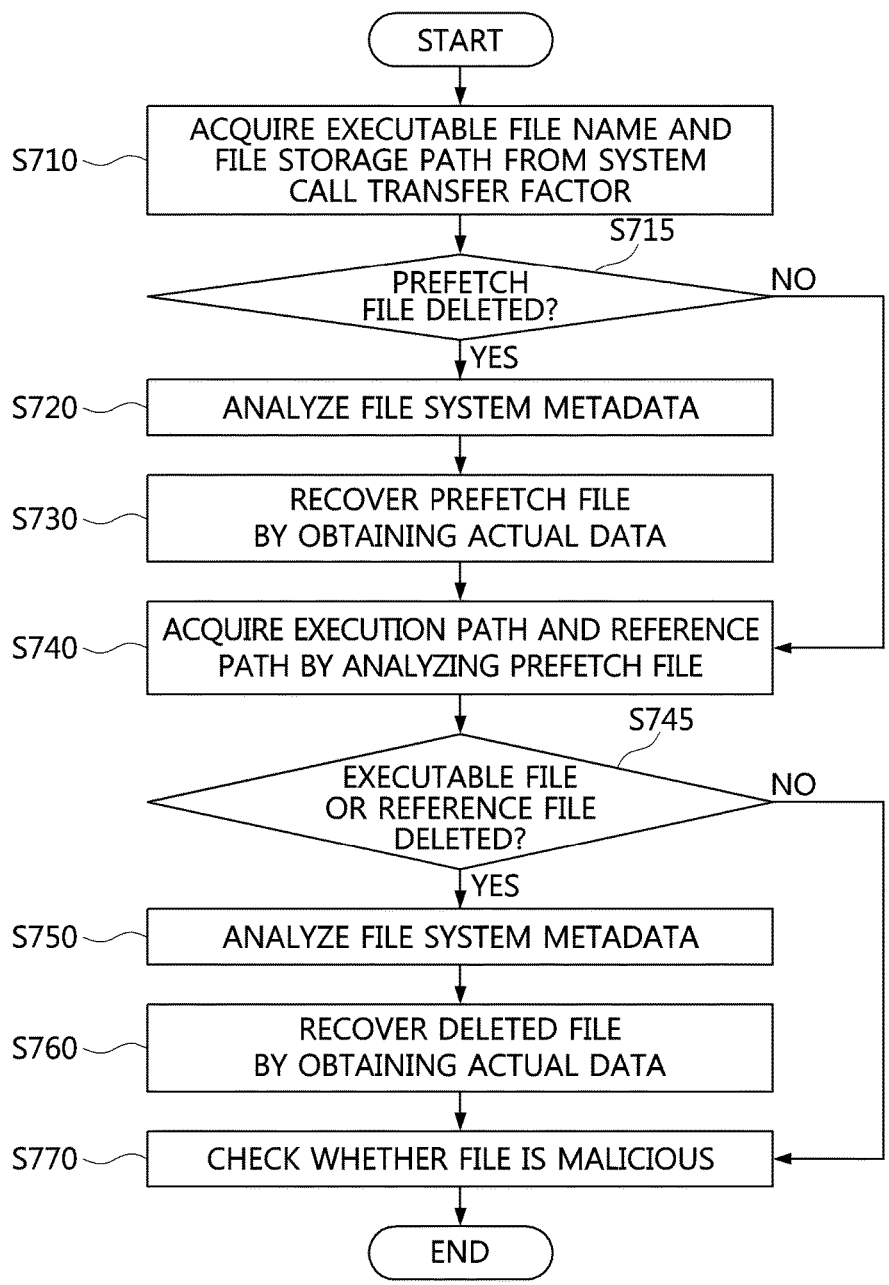
FIG. 7 is an operation flowchart showing in detail a procedure for checking whether an executable file and a reference file are malicious in the virtual machine monitoring method shown in FIG. 4.

FIG. 7 is an operation flowchart showing in detail a procedure for checking whether any of an executable file and a reference file is malicious in the virtual machine monitoring method shown in FIG. 4.

Referring to FIG. 7, in the procedure for checking whether an executable file and a reference file are malicious in the virtual machine monitoring method shown in FIG. 4, the executable file and a file storage path may be acquired from the system call transfer factor at step S710.

Here, a prefetch file corresponding to the executable file may be checked based on the executable file and the file storage path.

The prefetch file may correspond to a kind of cache file in which an OS stores information about an executable program loaded into memory so as to improve the execution efficiency of the program. Therefore, the prefetch file may include execution summary information, such as the execution path name of an executable file and the path name of a reference file executed along with the executable file, together with the main body of the program.

Thereafter, it may be determined whether the prefetch file has been deleted at step S715.

If it is determined at step S715 that the prefetch file has been deleted, the file system metadata may be analyzed at step S720.

Here, the file system metadata may denote the layout of the overall structure of a file system.

When the file system metadata is analyzed, information about a deleted file or directory, information about the location of a disk sector in which actual data is stored, etc. may be obtained.

Next, the prefetch file may be recovered by obtaining the actual data from the disk sector at step S730. That is, the disk sector corresponding to the prefetch file is searched for by analyzing the file system metadata, and the actual data may be acquired from the corresponding disk sector.

Thereafter, an execution path corresponding to the executable file and a reference path corresponding to the reference file may be acquired by analyzing the prefetch file at step S740.

Further, if it is determined at step S715 that the prefetch file has not been deleted, a procedure for recovering the prefetch file may be omitted, and the execution path and the reference path may be acquired by analyzing the present prefetch file.

Next, whether the executable file or the reference file has been deleted may be determined with reference to the execution path and the reference path at step S745.

If it is determined at step S745 that at least one of the executable file and the reference file has been deleted, file system metadata may be analyzed at step S750.

Thereafter, the deleted file may be recovered by obtaining the actual data from the disk sector at step S760.

In this case, similarly to the procedure for recovering the prefetch file, it is possible to search for a disk sector for the deleted executable file or the deleted reference file by analyzing the file system metadata, and to recover the deleted executable file or the deleted reference file by obtaining the actual data corresponding to the deleted executable file or the deleted reference file from the found disk sector.

Here, the term "disk sector" denotes the locations of virtual and physical storage devices indicated by information including a sector number, and may include information input required to measure a location, such as a sector number input to the Flash Translation Layer (FTL) of a Solid State Drive (SSD), the location of a physical storage device, such as the physical address of flash memory, etc.

Here, all recovery procedures may be performed based on any one of the hypervisor area and the virtual host area. For example, when at least one of the prefetch file, the executable file, and the reference file is deleted, the deleted file may be recovered based on any one of the hypervisor area and the virtual host area.

Thereafter, whether any of the executable file and the reference file is malicious may be checked at step S770.

In this case, it may be checked whether any of the executable file and the reference file is malicious, based on at least one of a signature-based malware detection technique, a behavior-based malware detection technique, and a malware detection technique based on the establishment of independent criteria.

Here, the signature-based malware detection method corresponds to a static analysis method, and may be performed by analyzing the features of previously collected malicious code and generating a signature for detecting the corresponding malicious code. For example, a method for judging previously known malicious code using an antivirus (AV) scan or analyzing character strings in a file header and a binary file may be used. In a more technical method, it may be determined whether the corresponding code is malicious code by using a method, such as the analysis of an Application Program interface (API) invocation relationship, based on a debugger.

Here, the behavior-based malware detection technique corresponds to a dynamic analysis method, and may use a scheme for hooking an API function in a user mode and a kernel mode or a scheme for monitoring an event notification routine automatically called by the system when a specific event occurs, in an analysis environment in order to detect a change in an OS. Here, based on the corresponding information, the sequence of execution of executable files may be entirely stored as a log. Further, the extent of similarity of the form of execution of the executable file to the form of execution of malicious code is measured. If the corresponding executable file is diagnosed as malicious code, the system may be recovered in the reverse direction of the sequence in which the files are executed, based on log values.

Here, the malware detection technique based on the establishment of independent criteria may literally correspond to a scheme for establishing independent criteria in the system and diagnosing an executable file, which satisfies the corresponding criteria, as malicious code.

In accordance with the present invention, it is possible to monitor an executable file in a virtual machine without installing an additional security program in the virtual machine.

Further, the present invention may provide a method that is capable of precisely performing monitoring and evidence collection even if a virtual machine OS kernel is hijacked due to hacking, by performing monitoring and evidence collection in a hypervisor area or a virtual host area.

Furthermore, the present invention may continuously monitor an executable file in a virtual machine and may automatically collect, as evidence, the main body of a malicious file or a related file required to investigate and analyze infringement incidents within a short period of time.

As described above, in the apparatus and method for monitoring a virtual machine based on a hypervisor according to the present invention, the configurations and schemes in the above-described embodiments are not limitedly applied, and some or all of the above embodiments can be selectively combined and configured so that various modifications are possible.

What is claimed is:
1. A computer-implemented method for monitoring a virtual machine based on a hypervisor, comprising:
monitoring an attempt to access an executable file located in a virtual machine;
generating an access event in response to detection of an exception which being occurred where a task accesses the location of a system call code and where the task accesses a page table entry indicating the location of the system call code, the page table being set to cause the exception;
detecting a location of a system call code corresponding to the executable file in virtual memory corresponding to the virtual machine, and determining whether the attempt to access the executable file has occurred in response to detection of the access event generated based on an attempt to execute the system call code, and
in response to detection of the attempt to access the executable file being detected, extracting a system call transfer factor which being accessed through a task;
acquiring, based on the system call transfer factor, an execution path corresponding to the executable file and a reference path corresponding to a reference file that is executed together with the executable file; and checking based on the execution path and the reference path whether any of the executable file and the reference file is malicious, and collecting a file in which malicious code is present in response to detection of the malicious code being present in any of the executable file and the reference file.

2. The method of claim 1, wherein the page table entry corresponds to at least one of a page table entry that corresponds to a page table managed by a kernel corresponding to the virtual machine and a page table entry that corresponds to a hardware-assisted address translation table inaccessible from inside the virtual machine.

3. The method of claim 1, wherein extracting the system call transfer factor is configured to, when the access event is detected, extract the system call transfer factor from at least one of a register and a stack used by the virtual machine.

4. The method of claim 3, wherein extracting the system call transfer factor is configured to, when the access event is detected, generate an identifier set by associating a virtual machine identifier corresponding to the virtual machine with a task identifier corresponding to the task, and identify at least one of the register and the stack based on the identifier set.

5. The method of claim 1, wherein acquiring the execution path and the reference path is configured to check whether a prefetch file corresponding to the executable file has been deleted, based on an executable file name and a file storage path that are included in the system call transfer factor, and to acquire the execution path and the reference path included in the prefetch file when the prefetch file remains rather than being deleted.

6. The method of claim 5, wherein acquiring the execution path and the reference path is configured to, when the prefetch file has been deleted, analyze file system metadata indicating a layout of an overall structure of a file system, search for a disk sector corresponding to the prefetch file, acquire actual data corresponding to the prefetch file from the disk sector, and then recover the prefetch file.

7. The method of claim 6, wherein the disk sector denotes locations of virtual and physical storage devices indicated by information including a sector number.

8. The method of claim 5, wherein collecting the file is configured to determine whether any of the executable file and the reference file has been deleted, with reference to the execution path and the reference path, and to recover a deleted file using the file system metadata when at least one of the executable file and the reference file has been deleted.

9. The method of claim 1, wherein collecting the file is configured to check whether any of the executable file and the reference file is malicious, based on at least one of a signature-based malware detection technique, a behavior-based malware detection technique, and a malware detection technique based on establishment of independent criteria.

10. The method of claim 8, wherein collecting the file is configured to perform recovery based on any one of a hypervisor area and a virtual host area.

11. The method of claim 10, wherein collecting the file is configured to collect a file in which malicious code is present from any one of the hypervisor area and the virtual host area and to store the collected file.

12. An apparatus for monitoring a virtual machine based on a hypervisor, comprising:
one or more computer-executable units being configured and executed by a processor using algorithm associated with at least one non-transitory storage device, the algorithm, when executed, causing the processor to execute one or units, the units comprising,
a monitoring unit for monitoring an attempt to access an executable file located in a virtual machine, the monitoring unit further configured for;
generating an access event in response to detection of an exception which being occurred where a task accesses the location of a system call code and where the task accesses a page table entry indicating the location of the system call code, the page table being set to cause the exception;
detecting a location of a system call code corresponding to the executable file in virtual memory corresponding to the virtual machine, and determining whether the attempt to access the executable file has occurred in response to detection of the access event generated based on an attempt to execute the system call code, and
in response to detection of the attempt to access the executable file being detected, extracting a system call transfer factor which being accessed through a task;
a path acquisition unit for acquiring, based on the system call transfer factor, an execution path corresponding to the executable file and a reference path corresponding to a reference file that is executed together with the executable file; and
a malicious file collection unit for checking based on the execution path and the reference path whether any of the executable file and the reference file is malicious, and collecting a file in which malicious code is present in response to detection of the malicious code being present in any of the executable file and the reference file.

13. The apparatus of claim 12, wherein the transfer factor extraction unit extracts the system call transfer factor from at least one of a register and a stack used by the virtual machine.

14. The apparatus of claim 12, wherein the transfer factor extraction unit is configured to, when the access event is detected, generate an identifier set by associating a virtual machine identifier corresponding to the virtual machine with a task identifier corresponding to the task, and identify at least one of the register and the stack based on the identifier set.

15. The apparatus of claim 12, wherein the path acquisition unit comprises:
a prefetch file checking unit for checking whether a prefetch file corresponding to the executable file has been deleted, based on an executable file name and a file storage path that are included in the system call transfer factor; and
a file recovery unit for, in response to detection of deletion of the prefetch file, analyzing file system metadata in any one of a hypervisor area and a virtual host area, and then recovering the prefetch file, wherein the execution path and the reference path are acquired through the prefetch file.

16. The apparatus of claim 15, wherein the file recovery unit is configured to analyze the file system metadata, search for a disk sector corresponding to the prefetch file, acquire actual data corresponding to the prefetch file from the disk sector, and then recover the prefetch file.

* * * * *